Oct. 13, 1959     W. J. JACOBSSON     2,908,158
LEAKAGE TESTING APPARATUS WITH FLUID PRESSURE REGULATOR
Filed Oct. 4, 1954     2 Sheets-Sheet 1

INVENTOR
WILGOT J. JACOBSSON
BY
ATTORNEY

Fig. 5.
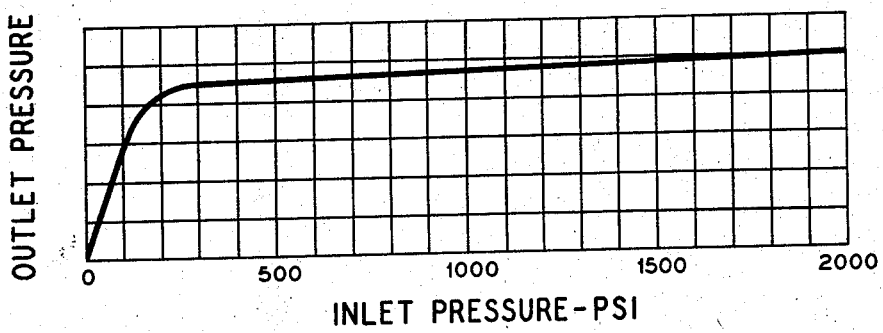
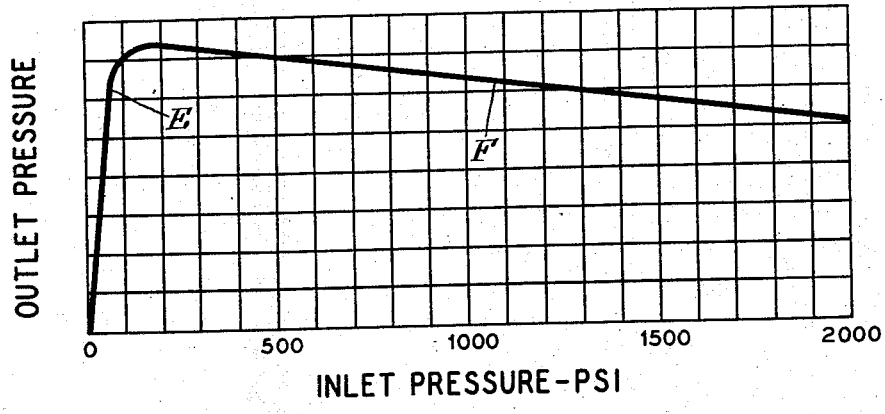
Fig. 6.

United States Patent Office 2,908,158
Patented Oct. 13, 1959

2,908,158

LEAKAGE TESTING APPARATUS WITH FLUID PRESSURE REGULATOR

Wilgot J. Jacobsson, Plainfield, N.J., assignor to Union Carbide Corporation, a corporation of New York Application October 4, 1954, Serial No. 460,087

4 Claims. (Cl. 73—46)

This invention relates to a two stage fluid pressure regulator and has for an object to reduce the expense and simplify the construction of such a regulator. Another object is to provide such a regulator in which a lower pressure gauge is adapted to be used in place of a higher pressure gauge for indicating the supply pressure leading to the first stage regulator. Another object is to insure that the flexible diaphragm for controlling the valve is securely clamped in position before the diaphragm springs are placed under stress.

The use of a less expensive pressure gauge has been made possible by appreciation of the fact that when a nozzle-type valve having predetermined pressure response characteristics is used in the first stage of a two stage regulator, a high-pressure gauge is not necessary and a less expensive lower-pressure gauge may be connected to to the intermediate pressure chamber, yet made to serve the purpose of a high-pressure gauge by indicating the degree of supply pressure or the degree of fullness of a pressure cylinder supplying gas to such device. Features of construction facilitating this new result are described hereinafter.

Fig. 5 shows the general type of an inlet-outlet pressure characteristic of a nozzle-type valve in a first stage of the regulator illustrated.

Fig. 6 is a similar characteristic for a stem-type valve.

Figure 1:
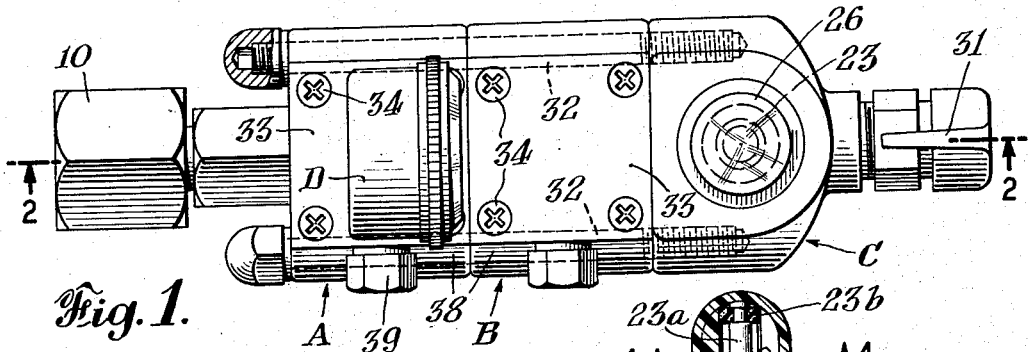
Fig. 1 is a top plan view of a preferred embodiment of this invention.
Figure 2:
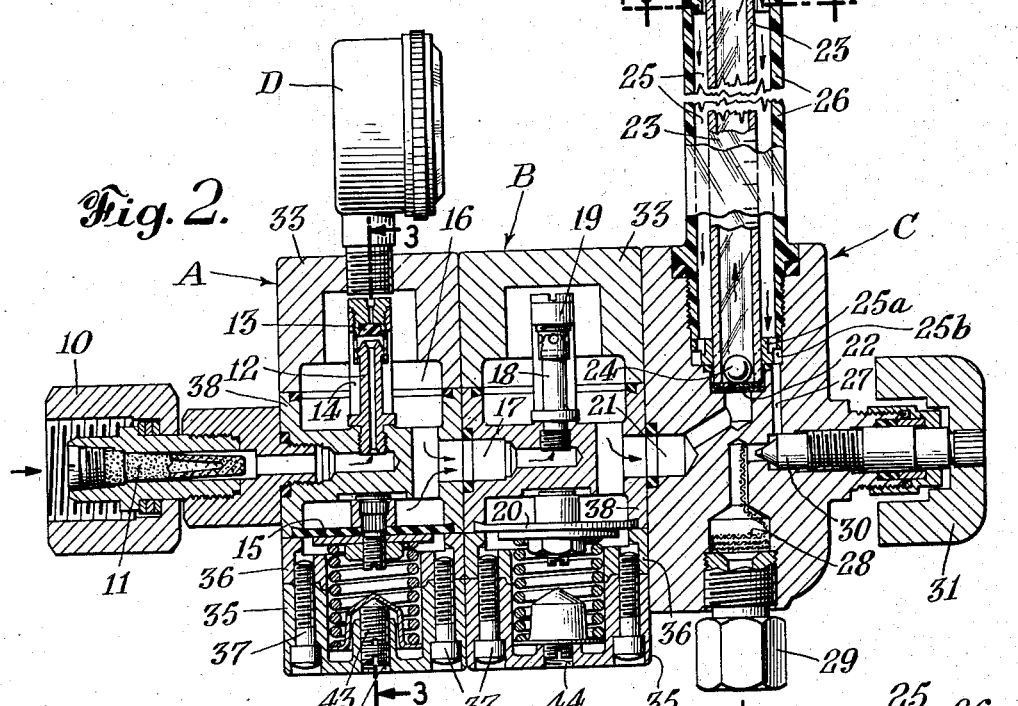
Fig. 2 is a section on the line 2—2 of Fig. 1.
Figures 3, 4:
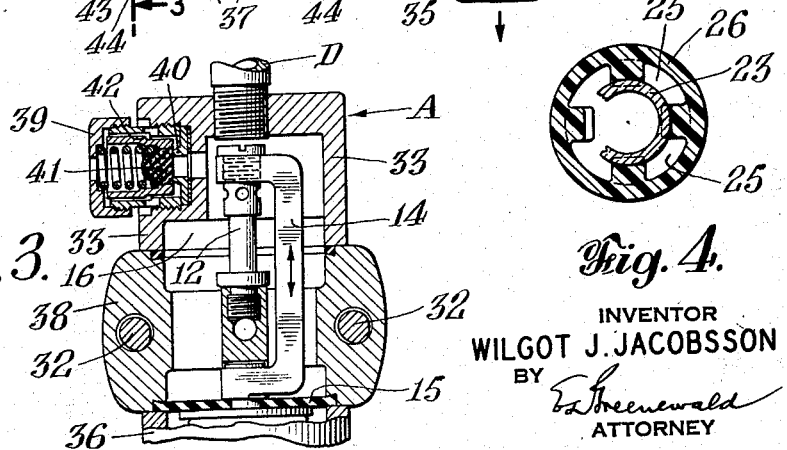
Fig. 3 is a section on the line 3—3 of Fig. 2 through a relief valve.
Fig. 4 is a section on the line 4—4 of Fig. 2.

The regulator illustrated comprises high and low pressture regulators A and B, respectively, connected in tandem as shown in Figs. 1 and 2, having a flowmeter C connected on the low-pressure side of the second-stage regulator. A pressure gauge D is connected to the intermediate pressure chamber, yet is graduated to indicate the degree of pressure in, or the degree of reduction of pressure in a gas pressure cylinder to which the regulator may be connected.

The connection 10 is adapted to be made to a high pressure gas cylinder, not shown. Some usual and convenient type filter 11 is adapted to keep out foreign particles from the regulator. High pressure gas passes up the passage in the stationary nozzle 12 which cooperates with a movable seat 13 carried by the movable yoke 14 in response to flexure of the diaphragm 15. After passing the high pressure or first-stage valve 12 and 13, the gas enters the intermediate pressure chamber 16, from whence it flows through the passage 17 up the nozzle 18 of the second-stage valve. The holder 19 of the movable seat is carried by a similar yoke member and moved in response to flexure of the diaphragm 20.

After passing the second-stage valve the gas flows through the passage 21, through the mesh screen 22, cooperating with the ball float 24 within the inner transparent tube 23. As is well known in this art, the height of the float 24 is read on graduations placed on either the inner tube 23 or the outer tube 26. The spacer and guide 23a above the inner tube 23 precludes the float 24 getting lodged above the inner tube. The gas, after passing the float, enters the down passage 25 between the inner and outer tubes 23 and 26. A spacer element 25a contains several passages leading from passage 25 to a chamber 25b which connects with one or more down passages 27 leading past a needle-type throttling valve 30 and past a layer of fine mesh 28 to the outlet connection 29. The porous mass or muffler 28 is preferably of bronze or brass and of about 250 mesh in size for the purpose of quieting any noise or whistling sound created by gas passing valve 30 when it is open. A handle 31 controls the adjustment of the valve 30 and thus controls the quantity of gas passing through the regulator.

Transverse bolts 32 connect the regulator sections and flow-meter housing into a single unit. Each regulator section includes an upper part 33. The lower portion of each regulator casing is in two parts 35 and 36. The upper part 36 of the lower portion is bolted to the main body portion 38 of the regulator to clamp the diaphragm 15 before such diaphragm is loaded by its spring illustrated. After being clamped by the upper portion 36 of each regulator, its diaphragm is then loaded by the spring illustrated and bolts 37 pass through these two portions, the bolts 37 being angularly spaced from the bolts, not illustrated, which secure the upper portion 36 to the main body portion 38 of each regulator.

A relief valve 39 on the intermediate chamber of the first regulator is set at a pressure well above that at which the first-stage regulator is expected to operate. A similar pressure relief valve is shown on the low pressure regulator in Fig. 1. Each relief valve includes a stationary nozzle portion 40, a seat 41 cooperating with the stationary nozzle and held closed by the spring illustrated. A shoulder 42 in this relief valve is for the purpose of limiting closing movement of the seat, and therefore preventing more than a predetermined amount of pressure and deformation ever reaching the soft resilient seat material 41 under the action of the spring illustrated. The provision of a stop in the relief valve to prevent such seat material being deformed as fully as it might otherwise be by the spring pressure is unusual. Customarily the greater the deformation of the seat material the better is the sealing. The high-pressure seat material for the first-stage valve is of some usually stiff material that will resist burning from heat of compression in the presence of oxygen such as the polytetrafluoroethylene known as Teflon. The second-stage valve seat is now of the same material.

To prevent the diaphragm from being unclamped in some part of its edge portion at the time spring pressure is applied thereto, the upper portion 36 of each two-part lower casing is bolted in place, clamping the diaphragms 15 and 20 before the springs are stressed against these diaphragms. The bolts 37 then secure the lower housing portions 35 to the portions 36, when the spring illustrated beneath each diaphragm stresses its diaphragm to the amount desired before the regulator leaves the factory. A screw 43 is adapted to adjust spring pressure beneath each regulator diaphragm when the lower casing portion 35 is bolted into position. The diaphragm then is prestressed by the spring. Beneath the screw 43 is a lock nut 45 for holding screw 43 in its adjusted position. The recess 44 under each lock nut 45 may then be filled with solder or wax or other appropriate sealing material. The result is a compact two-stage regulator in which no spring adjusting part projects out of the casing. The solder or wax between the outer surface of the housing and this lock nut hides the screw 43 and lock nut 45 and this solder or wax with the lock nut safeguards this screw from being accidentally moved from its position of adjustment and the calibration of the gauge D with the spring destroyed.

The discharge characteristic for a single stage regulator with a nozzle type valve is usually more nearly horizontal above the knee of the graph shown in Fig. 5 because a regulator is customarily intended to maintain as nearly a constant discharge pressure as is possible. Attainment of such a usual goal is dependent upon a large ratio of the effective diaphragm area to nozzle sealing area. In the present case however the first purpose of the pressure gauge D connected to the intermediate pressure chamber is to indicate cylinder pressures.

The upper or delivery end of the nozzle 12 is shown in Fig. 2 as having an inside taper causing the bore to be enlarged at the sealing area where the nozzle engages the seat for closing the valve, although the outside diameter of the nozzles 12 and 18 are shown in the drawing as being substantially the same size. As illustrated this inside taper has an included angle of approximately 60° and its purpose or effect is twofold as compared with what would be the case if such inside taper were absent. Perhaps the first effect is the reduction in ratio of the effective diaphragm area to the nozzle sealing area. An enlargement in this nozzle sealing area causes a steeper incline or gradient to the discharge characteristic above the knee of the graph. A second effect of the aforementioned inside taper to the first stage nozzle is the production of a discharge characteristic having the knee of the graph less sharply bent, or in other words the discharge characteristic above and below the knee forms a larger angle tending to make this graph more nearly a straight line. These two results enable the graduations on an intermediate pressure gauge for indicating high pressures to be more nearly uniformly spaced than they would be if this inside taper were absent, and the high pressure graduations on the intermediate pressure gauge are also enabled to be more widely spaced than they would be if such inside taper were absent. The gradient in Fig. 5 is not precise but only representative. Cylinder pressures often run as high as 2200 pounds per square inch for some gases and the intermediate pressure between the first and second stage valves is usually somewhere between about 100 and 150 pounds per square inch. The bore back of the taper in the first-stage nozzle is .086 of an inch, and at the outer end of the taper the sealing area has a diameter of .140 of an inch. The ratio of effective diaphragm area to the nozzle sealing area is approximately 1.065 square inches to .0154 of a square inch or about 69 to 1. The actual diameter of the diaphragm 15 is 1.435 inches, and the effective diameter is 1.165 inches. The degree of the slope in Fig. 5 is therefore what should be expected for a discharge characteristic when the high pressure varies between 2200 pounds per square inch down to nearly the pressure of the intermediate chamber or about 150 per square inch. The outlet pressure from the first-stage valve is relatively not important so long as it is well above the delivery pressure from the second-stage valve.

As shown in the drawing there is no outlet for fluid pressure from the intermediate pressure chamber except through the second-stage valve. If there were such an outlet from the intermediate pressure chamber a more nearly constant pressure within the chamber would be needed and the first-stage valve would then require a discharge characteristic more nearly like that of the usual regulator and less appropriate for use with an intermediate pressure gauge graduated to read high pressures. The diaphragm of the first and second stage valves are of the same size but the second-stage needs a more nearly constant delivery pressure than does the first stage valve. With the same size diaphragms a more nearly horizontal discharge characteristic requires either or both no inside bevel at the outer end of the nozzle and a smaller diameter nozzle bore because it is the ratio of effective diaphragm area to nozzle sealing area that controls the shape of the discharge characteristic. When this ratio is large a more nearly flat or horizontal characteristic may be expected beyond the knee of the graph. This is the case with the second stage valve.

The springs for regulators possess a load variation of about plus or minus 10% for a given compressed length of spring. In addition there is a tolerance variation in free length of spring. Also variations in dimensions of many parts of the regulator such as thickness of the diaphragm plate, distance of diaphragm clamping ledge on yoke to the seat 13, height of nozzle 12, thickness of the body portion 38, and other dimensions, may either aggravate or partially compensate for spring variations. The overall error in reading of pressure gauge D due to all of these factors may be too large for a regulator manufacturer to care to jeopardize his good will without having the gauge and spring calibrated or adjusted to one another. This is why an adjusting screw 43 for controlling spring stress will need to be conformed to a correct gauge reading, but after having once been set no further adjustment of this screw 43 is desired because to change it would make the gauge erratic, and to avoid accidental change in the screw 43 the lock nut 45 outside of the adjusting screw is set in place in the recess 44 in the lower cap portion 35, which recess is filled as described.

Where a high pressure gauge is provided in the supply passageway and no pressure gauge on the intermediate pressure chamber is needed, a variation in pressure of the intermediate pressure chamber of the sort indicated by the graph of Fig. 5 has no substantial effect on the maintenance of a fairly constant delivery pressure from the second-stage regulator. No adjusting screw is then needed for such first-stage spring. The second-stage valve is shown in the drawing as being of the nozzle type also. The same adjusting screw, lock nut, and precautions to prevent a change in adjustment of the second-stage diaphragm spring apply also as was described for the first stage spring.

Having the diaphragm clamping cap in two parts 35 and 36 as shown in the drawings is desirable for each stage where the diaphragms 15 and 20 are of only slightly larger diameter than the inside diameter of the ledge on which the diaphragm is clamped. Were such a two part spring housing not used there would be danger that an edge of the diaphragm might not get securely clamped properly when simultaneously clamping the diaphragm and applying stress to the diaphragm spring. With the two part construction shown it is desirable to clamp the diaphragm securely with portion 36 and then after that has been done, apply stress to the spring with the aid of the housing portion 35.

All parts of each high and low pressure regulator are interchangeable with the exception of their springs, and nozzles. Such interchangeability contributes to simplification and reduction in costs. Having the two regulators clamped to the flow meter as described and clamped to each other provides an easy way of connecting them.

The gauge D connected to the intermediate pressure chamber is graduated to read either or both the pressure of the gas in the high-pressure cylinder or the degree of reduction in such pressure or cylinder contents. The lower pressure gauge D is, according to the invention, made to serve the purpose of a high-pressure gauge between the cylinder and the first-stage valve, when the high-pressure valve is of the nozzle type illustrated and when such valve is open for the flow of fluid. Then when this first-stage valve is open the discharge characteristic of Fig. 5 shows how the gauge D is adapted to indicate cylinder pressure. A stem type valve having a characteristic shown in Fig. 6 is not adapted to be used in this high-pressure valve of the present two-stage regulator because the gauge D would not correctly indicate cylinder pressures when operating in the flat portion of such characteristic curve. However, due to the possibility of a gauge having two readings when a stem-type valve is used, such type of first-stage valve is inappropriate in the present invention. For example, when the pressure in the cylinder is of the values indicated by the points E and F on the graph of Fig. 6, the pressure gauge would read the same and an operator would be unable to tell with reliability which of two different pressures did in fact exist, were a stem-type valve employed in this invention. However, with the nozzle-type valve having a characteristic similar to that shown in Fig. 5, it will be noted that at no place on the curve will the gauge have any more than one reading. Valve D gives a correct reading only when gas is flowing and the first stage valve is open.

A nozzle type valve is one which opens with the aid of the inlet pressure whereas a stem type valve is one which opens against the inlet pressure on the valve.

The flowmeter disclosed herein is claimed in Patent 2,655,041 dated October 13, 1953 for Flowmeter.

I claim:

1. The combination with a flowmeter, of a shut-off valve downstream of the flowmeter, and a two-stage regulator having high and low pressure valves with an intermediate pressure chamber between them, high and low pressure chambers beyond said high and low pressure valves, said high pressure regulator valve being of a nozzle type, and a pressure gauge connected to said intermediate pressure chamber without any pressure gauge connected to the high pressure chamber, said gauge connected to the intermediate pressure chamber being graduated in pressures on the high pressure valve, whereby when the low pressure valve is closed by closure of said shut-off valve and the flowmeter indicates no flow and the gauge indicates a higher than normal increase in pressure when the high pressure valve should be closed, there is an indication of a leaky high pressure valve.

2. In a two-stage fluid pressure regulator of the type in which said regulators are mounted in tandem relation, the combination therewith of the improvement for enhancing compactness in the regulator and reducing inaccuracies in the diaphragm of each regulator, said improvement comprising for each regulator a main body portion a two-part casing on the side of said main body portion of the regulator containing a diaphragm and a spring for loading said diaphragm, the portion of said two-part casing adjacent the diaphragm being adapted to be secured to the main body for clamping the diaphragm edges without loading said diaphragm, the outer or second part of said two part casing being bolted to the first part, means in said outer part for adjusting said diaphragm loading spring and for sealing such adjustment whereby said diaphragm is tightly secured before the spring is adjusted and after adjustment to desired discharge pressure, such adjustment may be sealed to maintain the discharge characteristic of the regulator constant.

3. A fluid pressure regulator comprising a casing, including a main body portion and a two-part spring housing, a supply passageway in said casing, a discharge passageway also in said casing, a valve controlled port between said passageways, a diaphragm for actuating said valve, a spring cooperating with said diaphragm and spring housing, the portion of said spring housing abutting said diaphragm and around said spring being in two parts, the inner part being bolted to said main body portion of said casing, and clamping said diaphragm, and the outer part of the spring housing being bolted to the inner part, and means in said outer part for adjusting said spring and for locking and sealing the adjusting means whereby said diaphragm may be clamped in position before spring pressure is applied thereto.

4. In a two stage fluid pressure regulator comprising a casing, a high pressure supply passageway leading into said casing, a discharge passageway leading from said casing, an intermediate pressure chamber, a first stage valve between said intermediate pressure chamber and the high pressure passageway, a flexible diaphragm responsive to pressure in said intermediate pressure chamber, said valve having a stationary element and a moveable element, said movable valve element being shiftable in response to flexure of said diaphragm, one of said valve elements being of the nozzle type, a spring between said diaphragm and casing opposing movement of said diaphragm in response to pressure in said intermediate pressure chamber, a second stage valve between said intermediate pressure chamber and said discharge passageway, and a diaphragm and spring controlling movement of said second stage valve, the combination therewith of the improvement enabling high pressure in the supply passageway to be indicated without the expense of a high pressure gauge, said improvement comprising a flowmeter interposed in the discharge of said second stage valve, a shut-off valve beyond the flowmeter, a pressure gauge connected to the intermediate pressure chamber, graduated to indicate the values of pressure in the supply passageway where there is no high pressure gauge, the only normal exit for fluid pressure from said intermediate pressure chamber being through said second stage valve whereby a generally horizontal discharge characteristic is not needed for the first stage valve alone, and said second stage valve having a more nearly horizontal discharge characteristic than does said first stage valve above the knee of such a graph, whereby graduations on the intermediate pressure chamber gauge indicating high pressures may be more widely spaced than if said first stage valve had a discharge characteristic of the same general inclination as that of said second stage valve, whereby when the low pressure valve is closed by closure of said shut-off valve and the flowmeter indicates no flow and the gauge indicates a higher than normal increase in pressure when the high pressure valve should be closed, there is an indication of a leaky high pressure valve.

References Cited in the file of this patent

UNITED STATES PATENTS

| 1,145,256 | Mochow | July 6, 1915 |
| 1,515,911 | Terry | Nov. 18, 1924 |
| 1,731,519 | Bastian | Oct. 15, 1929 |
| 1,883,690 | Gilgenberg | Oct. 18, 1932 |
| 1,940,455 | Kilpela | Dec. 19, 1933 |
| 2,128,116 | Boone | Aug. 23, 1938 |
| 2,212,210 | Mesinger | Aug. 20, 1940 |
| 2,313,149 | Jacobsson | Mar. 9, 1943 |
| 2,362,352 | Buttner | Nov. 7, 1944 |
| 2,515,252 | Niederer | July 18, 1950 |

FOREIGN PATENTS

| 198,563 | France | of 1889 |